US006682280B1

(12) United States Patent  
Lindsay

(10) Patent No.: US 6,682,280 B1  
(45) Date of Patent: Jan. 27, 2004

(54) BOGIE WHEEL CARRIER

(76) Inventor: Frederick H. Lindsay, 9393 120th La. North, Seminole, FL (US) 33772-2636

( * ) Notice: Subject to any disclaimer, the term of this patent is extended or adjusted under 35 U.S.C. 154(b) by 0 days.

(21) Appl. No.: 10/195,591

(22) Filed: Jul. 15, 2002

(51) Int. Cl.[7] ................................................. B60P 7/08
(52) U.S. Cl. ............................. 410/80; 410/35; 410/46; 410/100
(58) Field of Search ............................. 410/34, 35, 44, 410/46, 80, 97, 100, 103; 280/408, 492, 493

(56) References Cited

U.S. PATENT DOCUMENTS

| | | | | |
|---|---|---|---|---|
| 2,152,804 A | * | 4/1939 | Hays | |
| 3,154,207 A | * | 10/1964 | Long | |
| 3,486,787 A | * | 12/1969 | Campbell | 410/80 |
| 4,089,539 A | * | 5/1978 | Berger | 410/80 |
| 4,456,414 A | * | 6/1984 | Williams | 410/80 |
| 4,986,705 A | * | 1/1991 | Durkin | 410/57 |
| 5,794,960 A | * | 8/1998 | Sill et al. | |
| 6,015,250 A | * | 1/2000 | Walsh et al. | 410/100 |
| 6,210,088 B1 | * | 4/2001 | Crosby | 410/35 |

\* cited by examiner

*Primary Examiner*—Stephen T. Gordon  
(74) *Attorney, Agent, or Firm*—Dennis G. LaPointe; Mason Law, P.A.

(57) ABSTRACT

The invention is a compact bogie wheel carrier, which can economically transport a building structure to a home site. It significantly reduces the cost to consumers by eliminating the built-in cost to the home for axle wheel assemblies, eliminates the need for a flag car when returning the carrier to the factory, and requires the use of only a pick-up truck to return the carrier to the factory. In one embodiment, provisions can be made to easily remove the carrier from under the home with a hitch connection at either end. The structurally framed carrier includes pass-through holes for building structure lower frames which have axle spring hangers depending from the lower flange thereof. The invention includes provisions for holding down the lower frame of the building structure as well as provisions to maintain the frame in position with flange alignment and clamp down hardware.

11 Claims, 8 Drawing Sheets

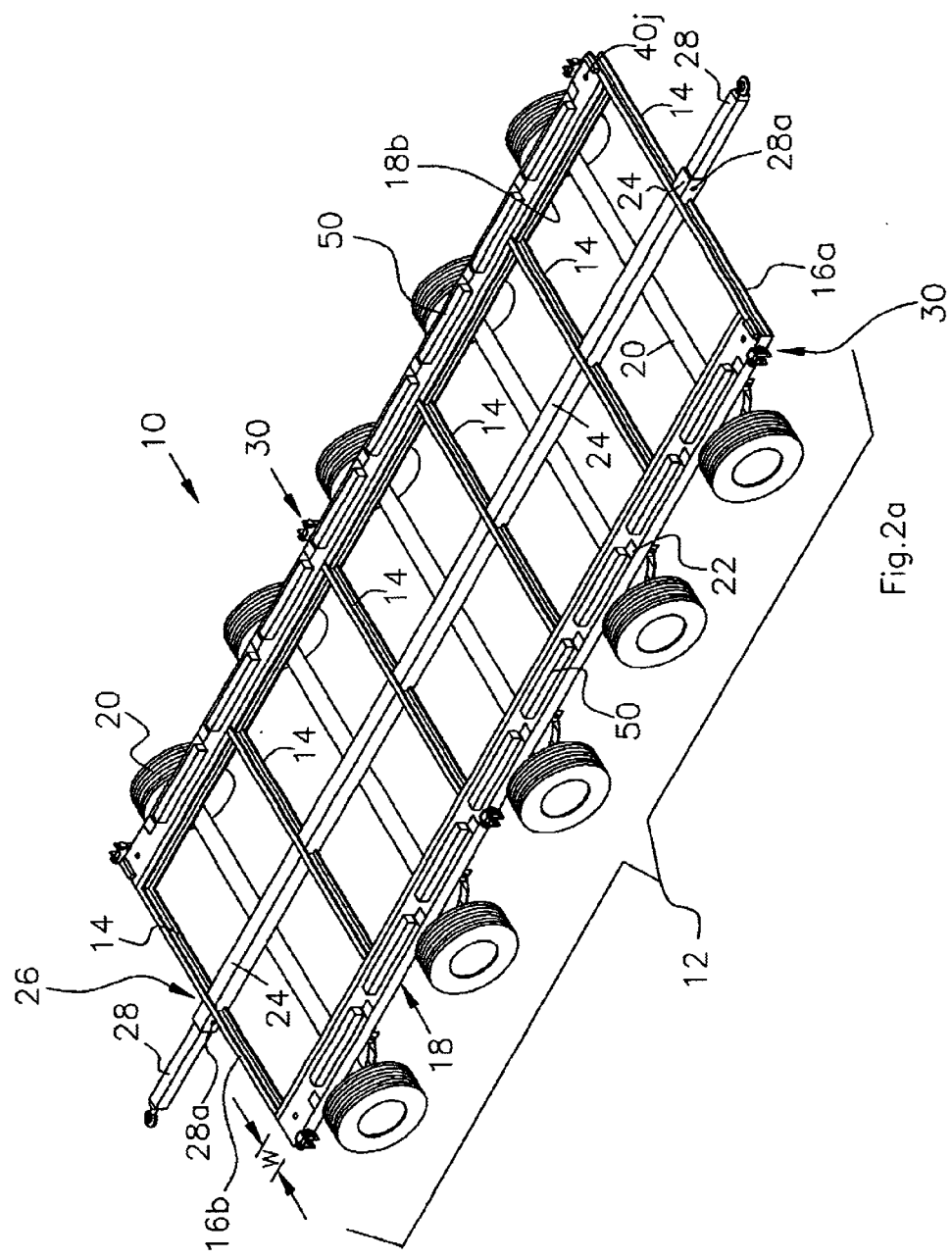

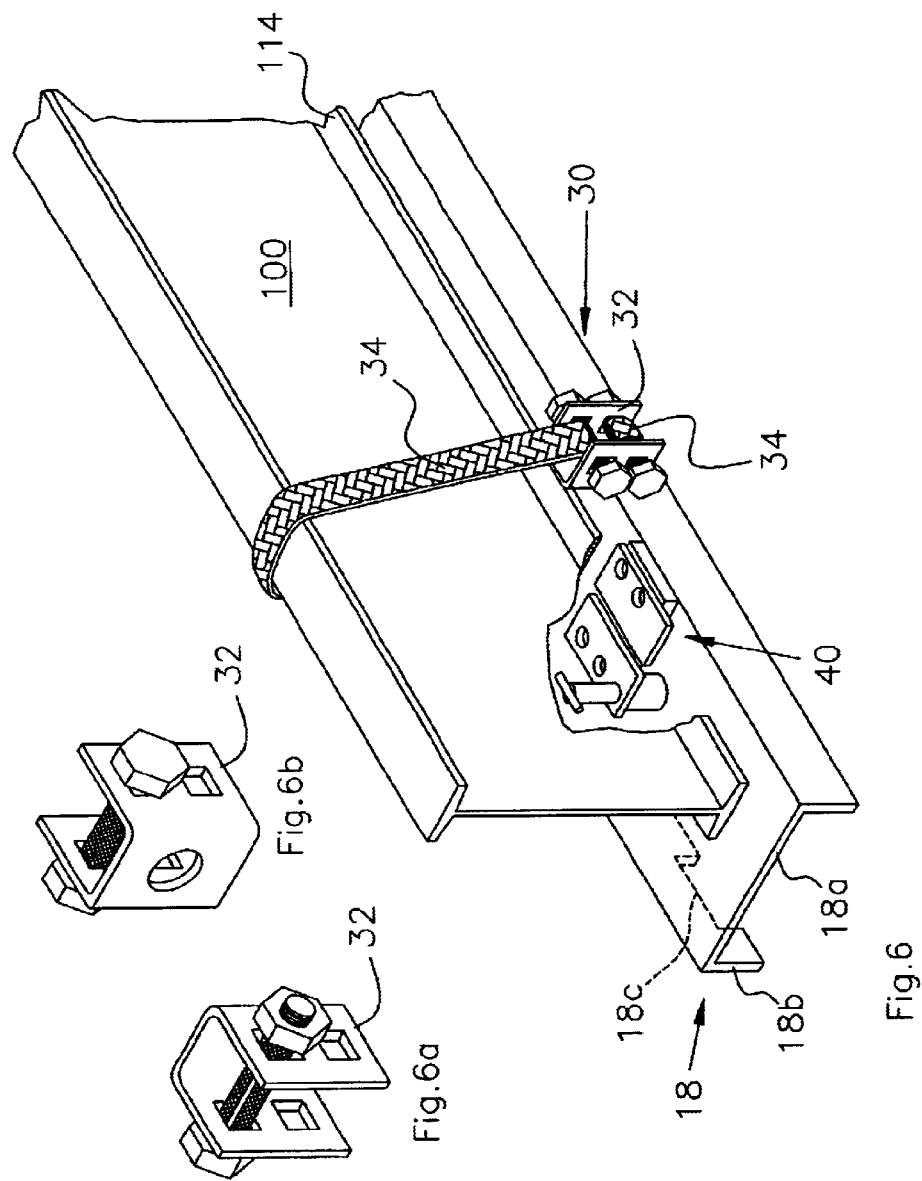

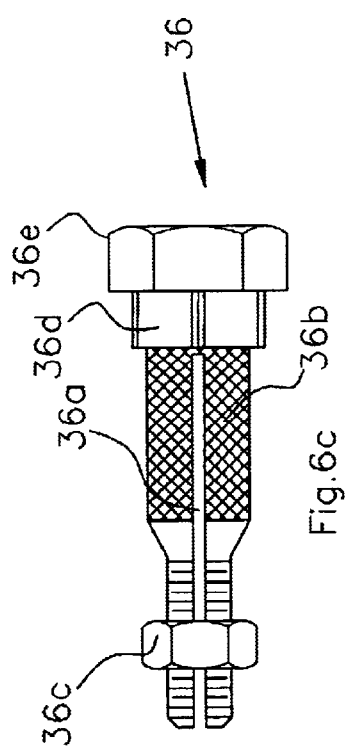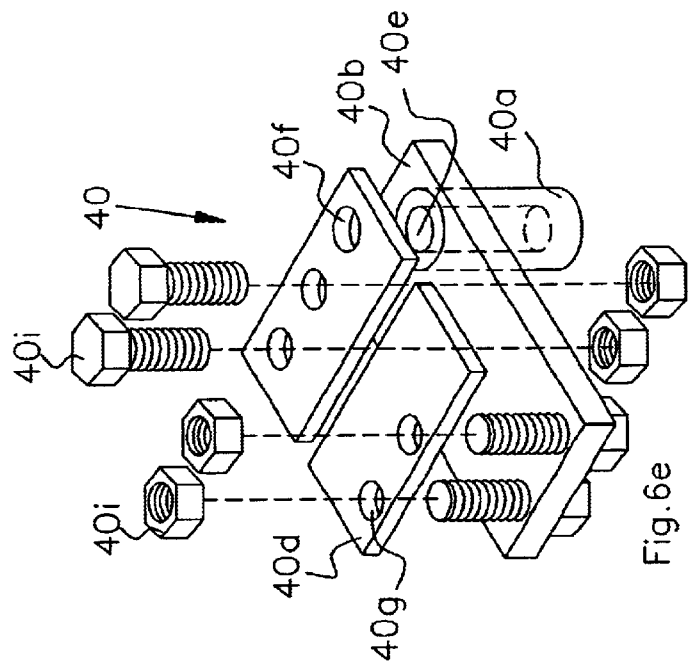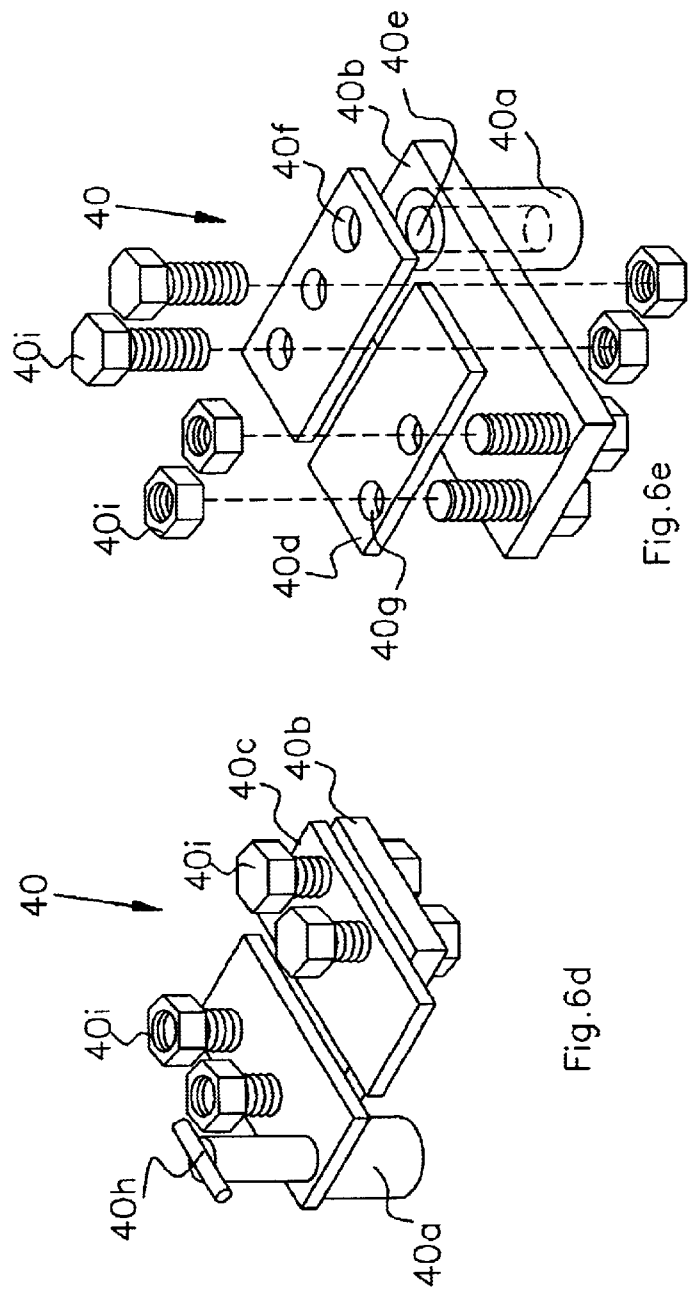

BOGIE WHEEL CARRIER

The invention relates to a wheel carrier for transporting a building structure such as a mobile home over the highways.

Manufactured housing prices are steadily increasing, as with other markets; however, one major built-in cost to the home is the cost of axle/wheel assemblies. Generally the wheels are removed when the home is placed on its foundation blocks. If the wheels and axles are to be removed, then the labor cost of doing so is built into the home price.

Under new Department of Transportation rules, there is an industry need to increase the number of axles under a transported building structure. The weight of the home determines how many axles will be used.

With the bogie wheel carrier described herein, the manufacturing plant for the building structure will not have to mount any axles to the chassis. No tires and wheels will have to be mounted to the chassis. The reusable bogie wheel carrier can be installed on the floor as the structure is being built or can be placed at the end of the assembly line where the building structure can be lifted and lowered on the carrier for transport. The building structure can be quickly separated from the bogie wheel carrier so the structure can be lowered onto its foundation blocks.

The manufacturer can then arrange to bring the bogie wheel carrier back for reuse. In addition, because the carrier is relatively compact in length, generally about 20 feet long, not counting the tongue or the hitch, it can be returned using a pick-up truck. If several structures were transported in a certain region, the bogie wheel carrier can be stacked with other bogie wheel carriers for return transport to the factory. It is anticipated that up to four carriers can be returned together. The bogie wheel carrier can typically accommodate up to five axle/wheel assemblies. Because a return trip to the factory would not require the need for five sets of wheels, selective wheels can be removed, so the carrier can be transported using a pick-up truck with minimal drag from the carrier.

For extremely long building structures, two underlying bogie wheel carriers can be used in tandem to transport the building structure to the home site. According to current prices, it is estimated that approximately $1400.00 can be saved off the cost of a typical mobile home.

The invention is hereafter described in more detail.

In the accompanying drawings:

FIG. 2a is a perspective view of the bogie wheel carrier of FIG. 2 with the spaced-apart spacers being longitudinally oriented;

FIG. 6 depicts a typical application of a strap tie down of the mobile home frame to the bogie wheel carrier;

FIGS. 6a and 6b are perspective views of the bracket used to secure the tie down strap depicted in FIG.6;

FIG. 6c is a view of a typical serrated and slotted bolt used to tighten down the strap depicted in FIG. 6; and FIGS. 6d and 6e depict typical views of a mobile home frame flange alignment clamping brackets.

Figure 1:
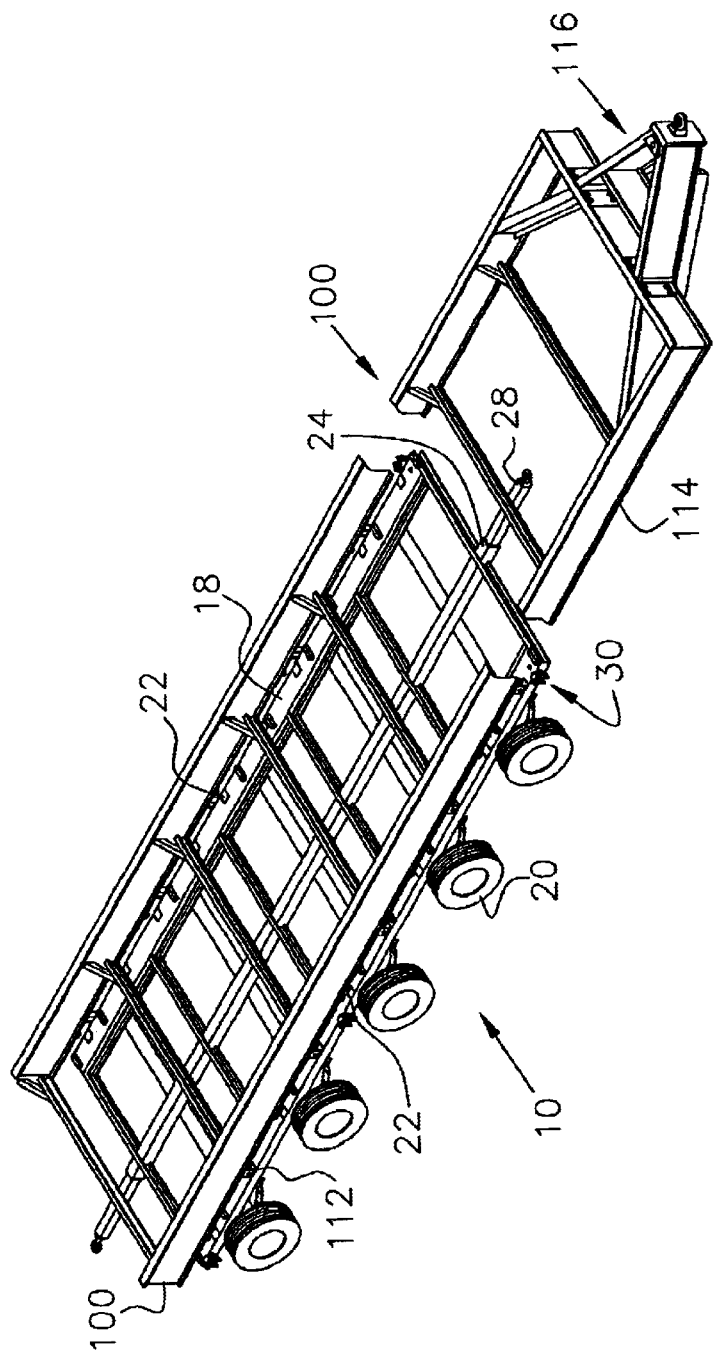
FIG. 1 is a perspective view of the inventive carrier depicting a manufactured home frame overlaying the bogie wheel carrier.
Figure 3:
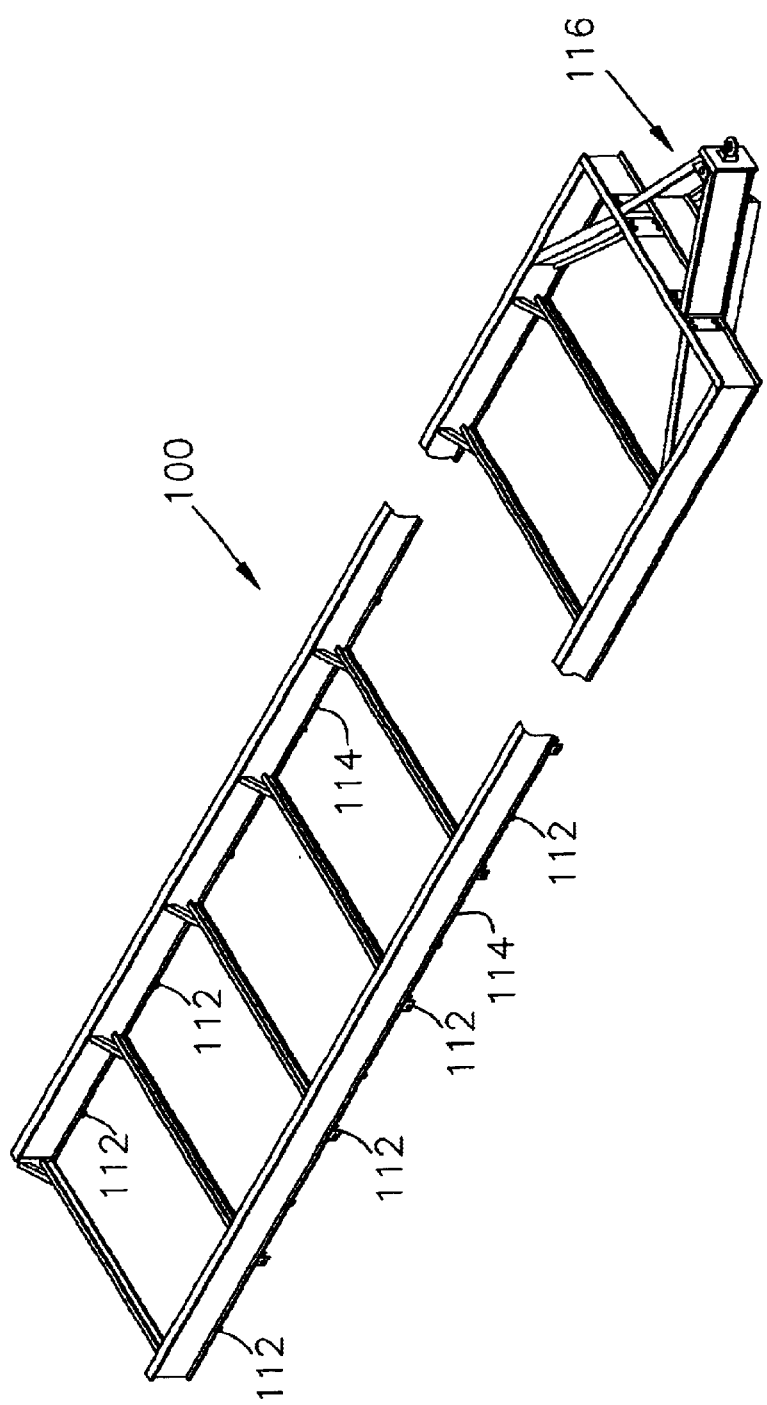
FIG. 3 is a perspective view of a typical frame portion of a manufactured home.
Figure 4:
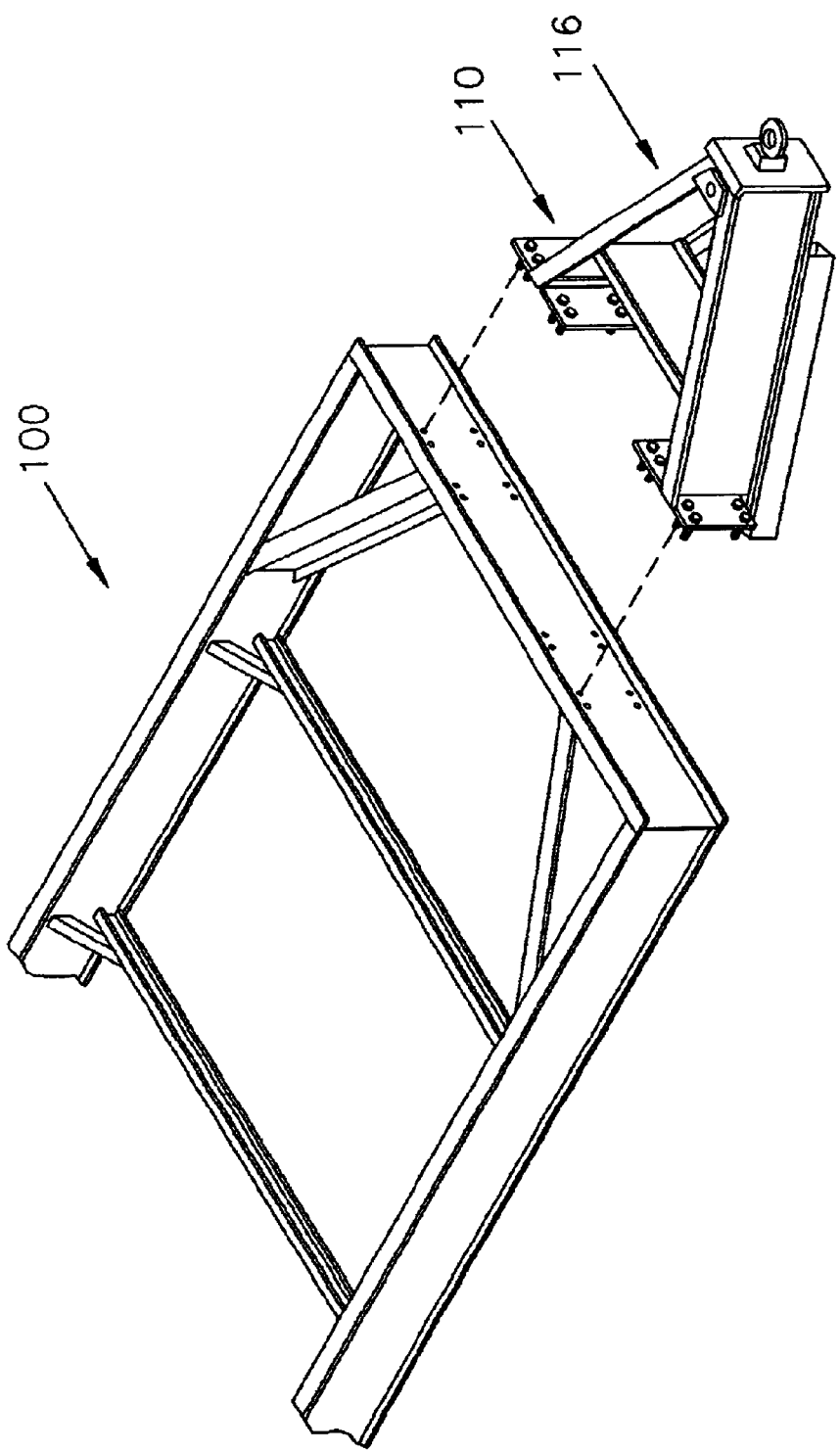
FIG. 4 is a perspective view of a detachable transport hitch assembly which can readily be detached from the mobile home frame after delivery to the home site.
Figure 5:
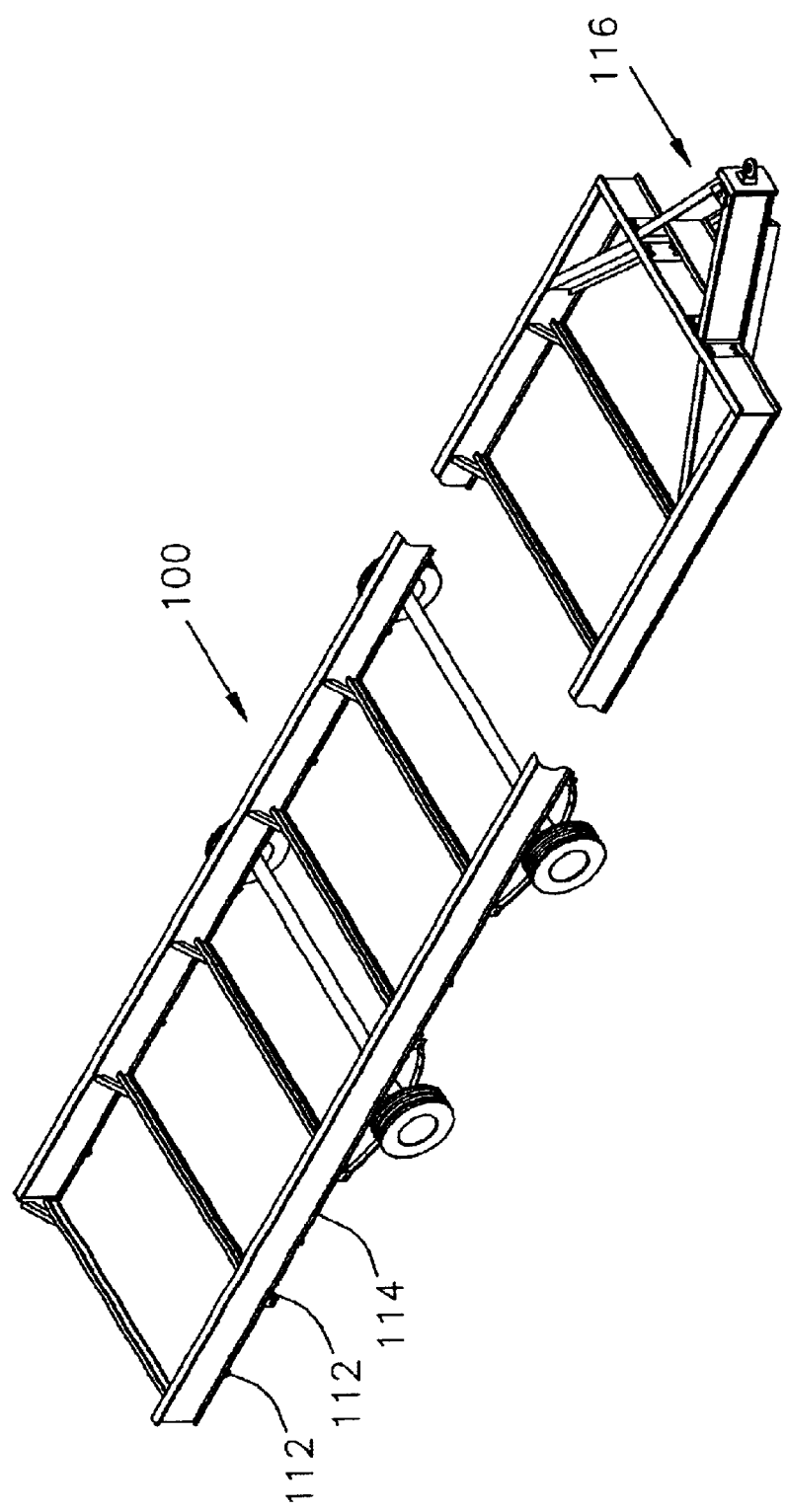
FIG. 5 is a mobile home frame depicting two of the axles and the axle springs mounted to spring hangers.

Referring now to the drawings, FIG. 1 discloses the invention, which is a bogie wheel carrier, depicted generally as 10, and underlies a frame 100 of a building structure to be transported. Typically, a manufactured home is transported with the axle/wheel assemblies pre-mounted at the factory on the frame 100 as shown in FIG. 5. A hitch assembly 116 is also fixed to one end of the frame 100; however, it is contemplated that a detachable hitch 116 be provided as conceptually depicted in FIG. 4. This can be accomplished by a number of means 110 such as using fasteners in a way to accommodate the easy and quick separation of the hitch assembly 116 from the frame 100. FIG. 3 depicts the frame 100 without the axle/wheel assemblies attached. For reference purposes, numeral 114 refers to the lower flange of the side frame 100 and numeral 112 refers to the front and rear axle spring hangers.

Figure 2:
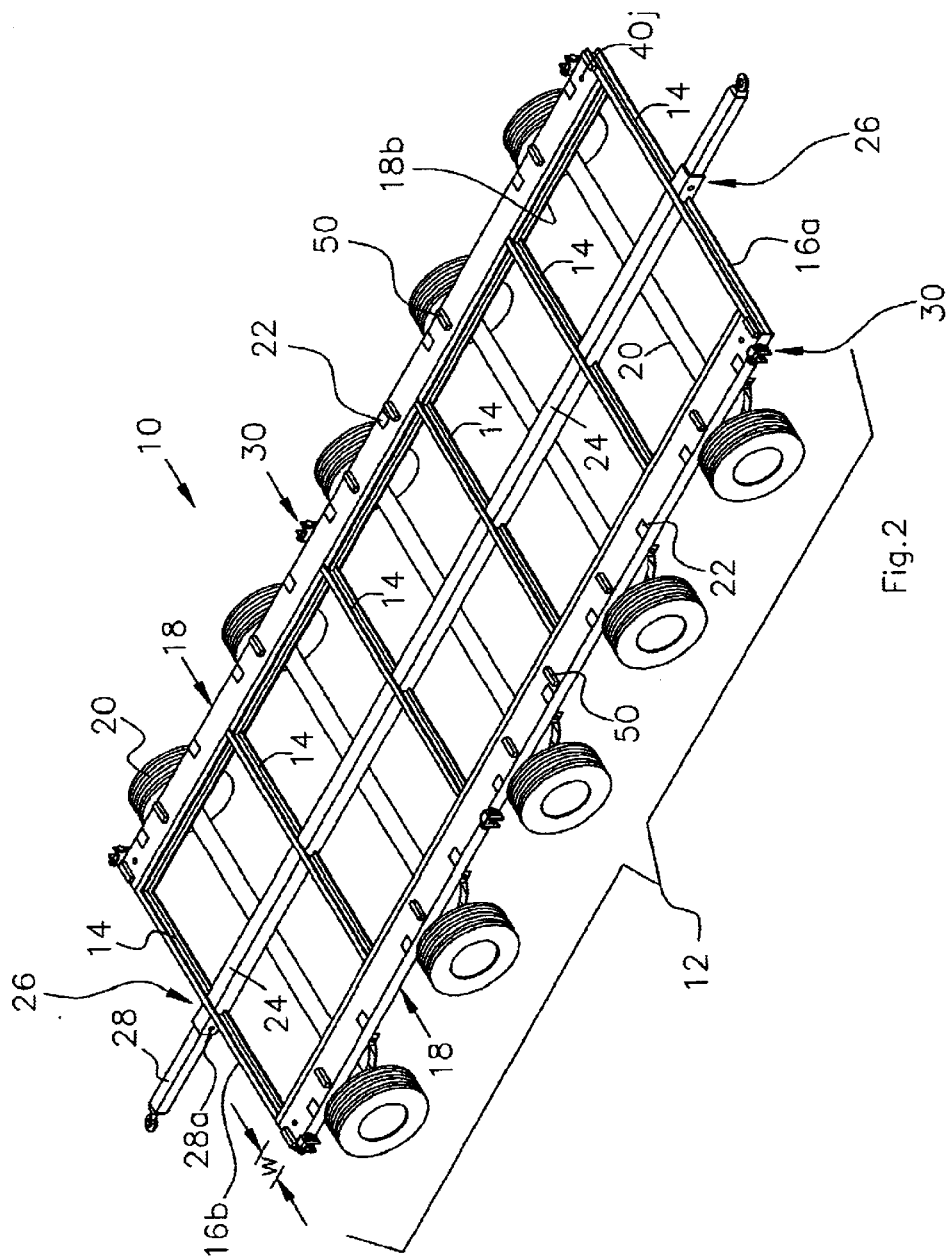
FIG. 2 is a perspective view of the bogie wheel carrier with spacers spaced-apart in a transverse orientation.

As shown in FIGS. 1, 2 and 2a, the bogie wheel carrier 10 for transporting a building structure across highways includes a carrier frame 12, which is constructed with a plurality of spaced-apart structural cross-members 14, including opposite end cross-members 14 at opposite ends 16a, 16b of the carrier frame 12. The cross-members 14 are fixed to opposing longitudinal side structural members 18 to complete a rectangular-shaped carrier frame.

For example, the members 14 may be constructed using C-channel 3×4.1# stock steel material and the side structural members 18 may be formed using one or more 3×4.1# stock members over which a notched C-channel 8×11.5# stock steel material is fixed thereto. FIG. 6 depicts a typical notch 18c in the C-channel leg 18b to accommodate the C-channel 18 placement and engagement with the cross-members 14. It should be understood that the choice of structural forms is optional with the frame manufacturer. Any combination of angle iron forms, I-beam forms, C-channel forms, tubular forms, pipe forms and sheet plate may be used as long the configuration and structural members are designed to carry the dynamic load of the building structure being transported.

A plurality of spaced-apart axle wheel assemblies 20 are mounted to an underside of the carrier frame 12. Typical front and rear spring hangers are included for mounting the springs from the axles. The bogie wheel carrier 10 can accommodate up to five axle wheel assemblies 20. If a significantly longer carrier is needed, then another bogie wheel carrier 10 can be connected in tandem to the bogie wheel carrier 10.

The longitudinal side structural members 18 are constructed so that each has a bearing surface 18a of sufficient width "W" so as to be in an underlying supportive relationship with a width of the lower flangel 14 of the side frame 100 of the building structure. The longitudinal side structural members 18 should have a plurality of spaced-apart apertures 22 pre-aligned so as to allow for the front and rear spaced-apart axle spring hangers 112 depending from the lower flange portions 114 of the building structure being transported to pass therethrough. Typically, a portion of the front and rear hangers 112 will pass through the opening of the apertures 22.

Building structure frame tie down means 30 for securing the building structure frame 100 to each of the longitudinal side structural members 18 are also included as well as building structure frame alignment and clamping means 40 for clamping and holding the building structure frame lower flange 114 in an overlying relationship with the longitudinal side structural members 18 during transport. Means 40 are typically located near each end of the longitudinal side structural members 18. Tie down means 30 and alignment and clamping means 40 will be described in more detail below.

Typically, a plurality of spacers 50 are inserted at intervals between each of the longitudinal side structural members 18 and the building structure longitudinal side frame lower flange portions 114 prior to lowering the building structure on the bogie wheel carrier. As shown in FIGS. 2 and 2a, these spacers 50 can be positioned transversally or longitudinally along the longitudinal side structural members 18. In a typical application, the spacers 50 could be made from 3"×3"×$^{3}/_{16}$" wall tubing. Each may be about 24 inches long as shown in FIG. 2a or 1"×1"×$^{3}/_{16}$" wall tubing by 3" long and oriented transversally for smaller building structures, as shown in FIG. 2.

The bogie wheel carrier frame 12 further includes means 26 for connecting a tow hitch adapter or bar 28 from at least one end thereof This can simply be done by connecting a tow hitch bar 28 to a receiver incorporated in the frame 12 and interlocking the hitch 28 using a pin connector 28a. In one embodiment, provisions can be made to select which end of the carrier frame 12 from which to tow the bogie wheel carrier 10. This can be accomplished by providing means 26 for connecting a tow hitch adapter 28 from either end of the carrier frame 12.

In another embodiment, the bogie wheel carrier 10 can include a longitudinal center structural member 24 as part of the carrier frame 12 construction. In this configuration, the center structural member 24 may have incorporated at each end provisions for attaching the hitch adapter 28. The receiver and/or center structural member 24 could be made from 3½"×3½"×$^{3}/_{16}$" wall steel tubing.

The building structure frame tie down means 30 for securing the building structure frame 100 to each of the longitudinal side structural members 18 can be provided in a number of ways and the choice is a matter of personal preference. One practical way is described herein as a relatively inexpensive choice using a strap which can be loosened or cut on site to easily facilitate the lifting of the building structure from the bogie wheel carrier 10. FIGS. 6, 6a, 6b and 6c illustrates conceptually one way of providing means 30.

At desired locations along the edge of each of the longitudinal side structural members 18, a bracket 32 is fixed. This bracket 32 may simply be a C-shaped bracket where the back side can be bolted or welded to the edge of the longitudinal side structural members. The legs of the bracket 32 can have two sets of apertures formed in a square shape into which strap tighten means or bolt 36 with its square shank portion 36d is inserted. With the square apertures, the driver does not need to place a wrench on the bolt head 36e; a single wrench is needed to tighten the nut 36c. The bolt 36 has a slot 36a running a substantial length of the bolt 36, at least through the thread and round shank portion. The bolt 36 also preferably has a gripping surface or knurled finish 36b on the round shank portion surface. A strap 34 is placed in one slot 36a and nut 36c is tightened to bind the strap end in place. The strap 34 is then wrapped around the frame 100 and the bogie wheel carrier frame 12. The opposite end of the strap 34 is then inserted in the slot 36a of the remaining bolt 36, and nut 36c is tightened to bind and tighten the strap 34 in place.

As noted above, another alternative might be to use the combination of straps 34 and a ratchet-type of tightening means. A typical strap suitable for use is a 1000 pound rated 1¼" wide strap×0.035" 109.000 PSE×3 feet long galvanized steel strap.

It is preferred that at least three such tie means 30 be provided on each side of the carrier frame 12, one being located near each of the opposite end cross-members 16a, 16b of the carrier frame 12 and at least one located therebetween.

As stated above, the bogie wheel carrier 10 further includes each building structure frame alignment and clamping means 40 for clamping and holding the building structure frame lower flange 114 in the overlying relationship with the longitudinal side structural members 18 during transport. In one application of each means 40, a hollow spacer member 40a is included. This can be made from a section of pipe or tubular member. For example, a mechanical tubing, DOM, 1¼" diameter by 3" long with a $^{25}/_{32}$" hole can be used. Spacer 40a can then just be vertically aligned with a desired hole 40j in the longitudinal side structural member 18 and placed over the hole 40j. It can also be welded to the surface 18a of structural member 18. Of course, if the 1"×1" spacers 50 are being used, then the length of spacer 40a can be shortened to correspond with the shorter height of spacers 50.

A first plate member 40b is located in an underlying relationship with the lower flange 114 of the building structure frame 100, with a portion thereof extending beyond the lower flange 114 on either side thereof. The first plate member 40b has apertures 40e in each portion extending beyond said lower flange 114 for receiving fasteners 40i therethrough. FIGS. 6d and 6e show a bolt and nut assembly depicted generally as 40i; however, washers could also be included. A second plate member 40c with its apertures 40f as generally depicted in FIG. 6e is located in an overlying relationship with one side of the lower flange 114. The apertures 40f are in a portion of the second plate member 40c, which extends beyond the lower flange 114 to an overlying relationship with one of the portions of the first plate member 40b, which extends beyond the lower flange 114. Some of the apertures 40f of the second plate member 40c are located so as to align with the corresponding apertures 40e of the first plate member 40b underlying the second plate member 40c. One of the apertures 40f aligns with the hollow spacer member 40a, which is vertically oriented and further aligns with an aperture 40j in the longitudinal side structural member 18.

A third plate member 40d with its apertures 40g is located in an overlying relationship with another side of the lower flange 114. The apertures 40g are in a portion of the third plate member 40d, which extends beyond the lower flange 114 to an overlying relationship with another of the portions of the first plate member 40b, which extends beyond the lower flange 114. The apertures 40g of the third plate member 40d are located so as to align with the corresponding apertures 40e of the first plate member 40b underlying the third plate member 40g. An alignment pin 40h is inserted through the second plate member aperture 40f, which aligns with the hollow spacer member 40a and the longitudinal side structural member 18. Fasteners 40i are inserted through the remaining second plate member apertures 40f and first plate member apertures 40e to clamp one side of the lower flange 114 in place. Fasteners 40i are then inserted through the apertures 40g, 40e of the third plate member 40d and first plate member 40b to clamp the other side of the lower flange 114 in place.

To further facilitate the clamping at the factory and the nuts and bolt heads of fasteners 40i may be selectively welded to the underside of first plate member 40b. Means 40 may be provided near the corners of the bogie wheel carrier 10 through the surface 18a of the longitudinal side structural members 18.

For an example of the construction of alignment and clamping means 40, first plate member 40b may be a ¼" steel plate 4"×8" with four ¹¹⁄₁₆" holes. Second plate member 40c may be ¼" steel plate 4"×6" with three ¹¹⁄₁₆" holes and third plate member 40d may be ¼" steel plate 4"×6" with two ¹¹⁄₁₆" holes.

As noted above, the building structure frame tie down means 30 secures the building structure frame 100 to each of the longitudinal side structural members; and the building structure frame alignment and clamping means 40 clamps and holds the building structure frame lower flange 114 in an aligned overlying relationship with the longitudinal side structural members 18 during transport.

When the building structure is delivered to the home site, pins 40h may simply be pulled, straps 34 may be cut and the building structure can be lifted and separated from the bogie wheel carrier 10. The bogie wheel carrier 10 can then be pulled out from underneath the building structure by connecting the tow hitch 28 and pulling the bogie wheel carrier 10. Hitch frame 116 can then be removed from the building structure frame 100, a desired set of wheels can be removed from the bogie wheel carrier and the wheels and hitch 116 can be tied down on the bogie wheel carrier 10. A pick-up truck can then tow the bogie wheel carrier back to the factory for eventual reuse.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed is:

1. A bogie wheel carrier for transporting a building structure across highways, the structure including its frame with spaced-apart axle spring hangers depending from longitudinal side frame lower flange portions, the frame further having tow hitch means at one end thereof, the bogie wheel carrier comprising:

a carrier frame having a plurality of spaced-apart structural cross-members, including opposite end cross-members at opposite ends of the carrier frame, the cross-members being fixed to opposing longitudinal side structural members to complete a rectangular-shaped carrier frame;

a plurality of spaced-apart axle wheel assemblies mounted to an underside of the carrier frame;

the longitudinal side structural members each being of sufficient width to be in an underlying supportive relationship with a width of the lower flange portions of the side frame of the building structure to be transported;

each of the longitudinal side structural members further having a plurality of spaced-apart apertures pre-aligned so as to allow for the spaced-apart axle spring hangers depending from the lower flange portions of the building structure being transported to pass therethrough;

building structure frame tie down means for securing the building structure frame to each of the longitudinal side structural members; and building structure frame alignment and clamping means for clamping and holding the building structure frame lower flange portions in an aligned overlying relationship with the longitudinal side structural members during transport, said alignment and clamping means being located near each end of the longitudinal side structural members.

2. The bogie wheel carrier according to claim 1, further comprising:

a plurality of spacers for spaced-apart insertion between each of the longitudinal side structural members and the building structure longitudinal side frame lower flange portions.

3. The bogie wheel carrier according to claim 1, wherein the carrier frame further includes means for connecting a tow hitch adapter from at least one end thereof.

4. The bogie wheel carrier according to claim 1, wherein the carrier frame further includes means for selectively connecting a tow hitch adapter from either end thereof.

5. The bogie wheel carrier according to claim 1, wherein the carrier frame further includes a longitudinal center structural member.

6. The bogie wheel carrier according to claim 5, wherein the longitudinal center structural member has means for connecting a tow hitch adapter from at least one end thereof.

7. The bogie wheel carrier according to claim 5, wherein the longitudinal center structural member has means for selectively connecting a tow hitch adapter from either end thereof.

8. The bogie wheel carrier according to claim 1, wherein the building structure frame tie down means for securing the building structure frame to each of the longitudinal side structural members comprises:

a bracket fixed to a side edge of each of the longitudinal side structural members, one said bracket being located near each of the opposite end cross-members of the carrier frame and at least one said bracket located therebetween;

for each bracket, a strap of sufficient length to wrap around the longitudinal side structural member and the building structure frame;

strap tightening means on each bracket for tightening each end of the strap.

9. The bogie wheel carrier according to claim 8, wherein each bracket is C-shaped with two bolt fasteners extending through each leg of the bracket, each bolt fastener shank being knurled with a slot therein for passing an end of the strap and subsequent rotation of the bolt for tightening the strap.

10. The bogie wheel carrier according to claim 2, wherein each building structure frame alignment and clamping means for clamping and holding the building structure frame lower flange portions in the aligned overlying relationship with the longitudinal side structural members during transport comprises:

a hollow spacer member;

a first plate member, the first plate member being in an underlying relationship with one of said lower flange portions of the building structure frame and having a portion thereof extending beyond said lower flange portion on either side thereof;

the first plate member further having apertures in a portion of said first plate member which extends beyond said lower flange portion for receiving fasteners therethrough;

a second plate member, the second plate member having apertures therein, the second plate member being in an overlying relationship with one side of the lower flange portion, the second plate member apertures being in a portion of the second plate member which extends beyond the lower flange portion to an overlying relationship with the portion of the first plate member which extends beyond the lower flange portion;

some of the apertures of the second plate member aligning with the corresponding apertures of the first plate member underlying the second plate member and one of the second plate member apertures aligns with the hollow spacer member which is vertically oriented and further aligns with an aperture in one of the longitudinal side structural members;

a third plate member, the third plate member having apertures therein, the third plate member being in an overlying relationship with another side of the lower flange portion, the third plate member apertures being in a portion of the third plate member which extends beyond the lower flange portion to an overlying relationship with the portion of the first plate member which extends beyond the lower flange portion; and the apertures of the third plate member aligning with the corresponding apertures of the first plate member underlying the third plate member, wherein an alignment pin is inserted through the second plate member aperture which aligns with the hollow spacer member, the hollow spacer member and the longitudinal side structural member and fasteners are inserted through the other ones of said second plate member apertures and first plate member apertures to clamp one side of the lower flange portion in place and fasteners are inserted through the ones of said apertures of the third plate member and first plate member to clamp another side of the lower flange portion in place.

11. The bogie wheel carrier according to claim 10, wherein said hollow space member is fixed to the longitudinal side structural member.

* * * * *